United States Patent

[11] 3,578,856

| [72] | Inventors | Kurt Thate<br>Munich;<br>Friedrich Winkler, Unterhaching; Anton<br>Theer, Munich, Germany |
|---|---|---|
| [21] | Appl. No. | 820,491 |
| [22] | Filed | Apr. 30, 1969 |
| [45] | Patented | May 18, 1971 |
| [73] | Assignee | AGFA-Gevaert Aktiengesellschaft<br>Leverkusen, Germany |
| [32] | Priority | May 18, 1968 |
| [33] | | Germany |
| [31] | | A 29 797 |

[54] MOTION PICTURE CAMERA WITH FOOTAGE COUNTER
13 Claims, 3 Drawing Figs.

| [52] | U.S. Cl. | 352/172 |
|---|---|---|
| [51] | Int. Cl. | G03b 1/60 |
| [50] | Field of Search | 352/172, 170, 171 |

[56] References Cited
UNITED STATES PATENTS

| 3,145,613 | 8/1964 | Mueller | 352/172X |
|---|---|---|---|
| 3,297,397 | 1/1967 | Grant et al. | 352/172 |
| 3,363,528 | 1/1968 | Winkler et al. | 352/170X |

FOREIGN PATENTS

| 702,167 | 1/1954 | Great Britain | 352/172 |

*Primary Examiner*—S. Clement Swisher
*Assistant Examiner*—Joseph W. Roskos
*Attorney*—Michael S. Striker

ABSTRACT: A motion picture camera wherein the film transporting mechanism drives a worm in response to insertion of a film magazine, and the worm moves a pointer with reference to a graduated footage counter scale to indicate the length of exposed and/or unexposed part of the film. The worm is pivoted away from engagement with the pointer in response to removal of the magazine whereby a spring resets the pointer to zero position. The scale transmits light and has an arm which is observable in the view finder. When the pointer moves all the way from starting position, it completely shields the scale from ambient light whereby the operator is informed that the entire film is exposed.

PATENTED MAY 18 1971
3,578,856
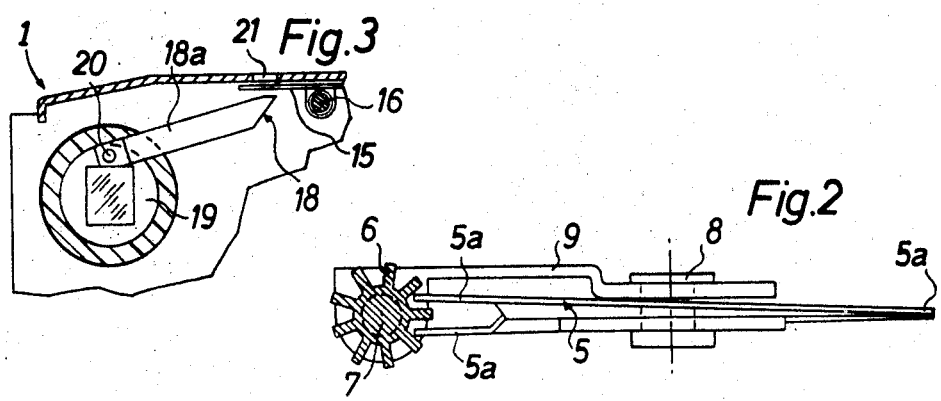
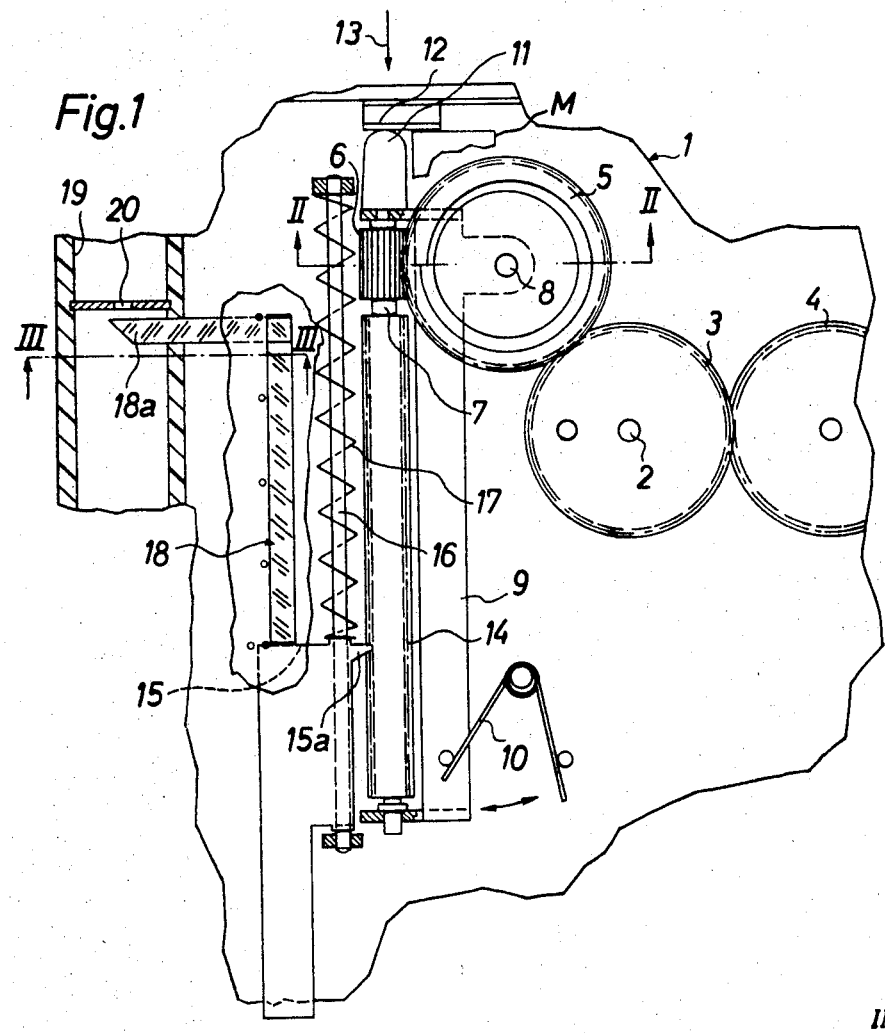
INVENTOR.
KURT THATE
FRIEDRICH WINKLER
ANTON THEER
BY
Michael S. Id. ln
Attorney 3,578,856

MOTION PICTURE CAMERA WITH FOOTAGE COUNTER

BACKGROUND OF THE INVENTION

The present invention relates to photographic apparatus, and more particularly to improvements in film footage counters for motion picture cameras. Still more particularly, the invention relates to automatically resettable film footage counters which are especially suited for use in 8-millimeter motion picture cameras.

SUMMARY OF THE INVENTION

One of the objects of our invention is to provide a film footage counter which occupies little room in a motion picture camera and which can be reset to zero in a novel and improved way.

Another object of the invention is to provide a film footage counter which is automatically reset in response to removal of exposed film from the camera body.

A further object of the invention is to provide a film footage counter which furnishes continuous readings indicating the length of exposed and/or unexposed parts of motion picture film and which is further capable of indicating exposure of entire film.

Still another object of the invention is to provide a motion picture camera which embodies the improved footage counter and wherein the footage counter can be installed with relatively small expenditures in material and man hours.

An ancillary object of the invention is to provide a novel footage counter scale for use in motion picture cameras.

The improved motion picture camera comprises a housing or body, film transporting means mounted in the housing and operative to advance the film during exposure whereby the length of exposed and unexposed parts of the film respectively increases and decreases, a scale preferably fixedly mounted in the housing and having graduations or other suitable indicia representing the length of at least one of the film parts, a pointer movable in the housing from a starting position to pinpoint on the scale the length of the one film parts, motion transmitting means including a first portion driven by the transporting means and a second portion separably engaging the first portion and being preferably rigid with the pointer to move the latter from starting position when the transporting means is operated upon insertion of motion picture film into the housing, and disengaging means for automatically separating the first and second portions of the motion transmitting means in response to removal of film from the housing to thus permit movement of the pointer to starting position, preferably under the action of a helical spring or other suitable biasing means which permanently urges the pointer to starting position.

The first portion of the motion transmitting means is preferably a worm which is rotatably mounted on a lever to move therewith between first and second positions. The second portion of the motion transmitting means preferably comprises a follower tooth on the pointer. The tooth engages with and is moved by the worm when the latter is held in first position by a torsion spring or the like. A stronger spring which constitutes or forms part of the disengaging means can pivot the lever to second position to thereby disengage the worm from the follower tooth in response to removal of a film magazine, cartridge or cassette from the housing whereby the pointer automatically returns to starting position.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is an enlarged fragmentary horizontal sectional view of a motion picture camera which embodies the invention, the pointer being shown in its starting position;

FIG. 2 is a fragmentary vertical sectional view as seen in the direction of arrows from the line II–II of FIG. 1; and FIG. 3 is a fragmentary vertical sectional view as seen in the direction of arrows from the line III–III of FIG. 1.

DESCRIPTION OF THE PREFERRED EMBODIMENTS

FIG. 1 illustrates a portion of a motion picture camera, preferably a camera utilizing 8-millimeter film, which comprises a housing or body 1 accommodating a rotary shaft 2 for a takeup reel (not shown). The shaft 2 is connected with a gear 3 which forms part of the film transporting mechanism and meshes with a driver gear 4 and with a gear 5 whose teeth form a worm thread 5a (see also FIG. 2). The axial length of the gear 3 is such that it is in mesh with the teeth of the gear 5 in each angular position of the latter gear, i.e., also during transition from engagement with the first into engagement with the second convolution of the worm thread 5a. The pitch of the thread 5a corresponds to the circumferential distance between the teeth of a gear wheel 6 whose shaft 7 is normal to the shaft 8 of the gear 5. The thread 5a of the gear 5 engages with the teeth of the gear wheel 6 in order to rotate the gear wheel through an angle corresponding to the circular pitch of the gear wheel in response to each revolution of the gear 5. The shaft 7 of the gear wheel 6 is rotatably mounted in the brackets of a carrier or bearing here shown as a lever 9 which is rockable on the shaft 8 of the gear 5. A torsion spring 10 biases the lever 9 in a clockwise direction, as viewed in FIG. 1. It will be noted that the axis of the gear wheel 6 is tangential to the gear 5 so that the teeth of gear wheel 6 remain in mesh with the worm thread 5a in each angular position of the lever 9.

The shaft 7 carries a cupped abutment member or extension 11 which is biased by torsion spring 10 against a disengaging spring 12. When a film-containing magazine or cassette M is properly inserted into the housing 1, the disengaging spring 12 assumes the position shown in FIG. 1. If the magazine M is removed, the spring 12 pushes the extension 11 in the direction indicated by arrow 13 whereby the lever 9 turns in a counterclockwise direction and stresses the torsion spring 10 which is weaker than the displacing spring 12. The shaft 7 further carries an elongated worm 14 which is rigid with the gear wheel 6.

The footage counter comprises a pointer 15 which constitutes an opaque flag and cooperates with a fixed footage counter scale 18. The pointer 15 is reciprocable along a guide rod 16 which is parallel to the shaft 7 when the latter assumes the first position shown in FIG. 1, i.e., when the magazine M is properly inserted into the housing 1 and maintains the displacing spring 12 in the illustrated position. A helical resetting spring 17 surrounds the guide rod 17 and biases the pointer 15 toward the zero or starting position in which a follower tooth 15a of the pointer registers with the zero graduation of the scale 18. The tooth 15a engages the thread of the worm 14. The scale 18 is calibrated to indicate various lengths of exposed and/or unexposed parts of motion picture film.

When the motion picture camera is in use and the film transporting mechanism including the gears 3, 4 rotates the shaft 2 so that the takeup reel on the shaft 2 collects exposed film, the gear 3 rotates the gear 5 and the latter rotates the gear wheel 6 and worm 14 whereby the follower tooth 15a of the pointer 15 follows the thread of the worm 14 and moves the pointer upwardly, as viewed in FIG. 1, by simultaneously compressing the resetting spring 17. The opaque part of the pointer overlaps a progressively larger portion of the scale 18 whereby the area of the overlapped scale portion corresponds to the length of the exposed part of motion picture film. When the entire film is exposed, the pointer 15 overlaps the entire scale 18. If the magazine M with exposed film therein is thereupon removed from the housing 1, the disengaging spring 12 pushes the abutment member 11 in the direction indicated by arrow 13 whereby the lever 9 turns on the shaft 8 in a counterclockwise direction to assume a second position and moves the worm 14 away from engagement with the follower tooth 15a. Thus, the spring 17 is free to expand and to reset the pointer 15 to starting position. When the operator thereupon decides to insert a fresh magazine M with unexposed film therein, the disengaging spring 12 returns to the position shown in FIG. 1 and the torsion spring 10 returns the worm 14 into engagement with the follower tooth 15a in starting position of the pointer 15. It will be noted that the worm 14 engages with the follower tooth 15a only when the housing 1 accommodates a magazine M. The worm 14 and tooth 15a respectively constitute separable first and second portions of a motion transmitting device which derives motion from the film transporting mechanism and serves to move the pointer 15 from starting position.

In accordance with another feature of our invention, the scale 18 constitutes a light transmitting bar and has a portion or arm 18a which extends into the view finder 19 of the camera. The view finder 19 accommodates a partition having an eccentrically positioned opening or window 20 (see also FIG. 3) which registers with the tip of the arm 18a. The graduated portion of the scale 18 is fully exposed to ambient light when the pointer 15 assumes the starting position shown in FIG. 1. Therefore, the tip of the arm 18a behind the window 20 is illuminated and the operator of the camera can see that the camera contains at least some unexposed film by simply looking through the viewfinder 19 and by noting that the tip of the arm 18a is illuminated. When the pointer 15 is caused to move to its other end position in which it overlaps the entire graduated portion of the scale 18, the latter cannot receive light and the tip of the arm 18a is dark. This indicates to the operator that the film in the magazine M is exposed and that a fresh magazine must be inserted into the housing 1.

The footage counter of FIGS. 1 to 3 is susceptible of many modifications without departing from the spirit of our invention. For example, the disengaging spring 12 can be stressed by a film supply cartridge, and the pointer 15 can actuate an electric switch which causes a lamp or another signal generating device to produce a visible and/or audible signal when the entire film is exposed. Furthermore, the graduations of the scale 18 can indicate the length of unexposed motion picture film.

The graduated portion of the scale 18 is preferably located behind a light admitting window 21 (see FIG. 3) so that the operator of the camera can read the scale in order to determine the exact length of the exposed and/or unexposed part of the film. The opaque portion of the pointer 15 is reciprocable between the window 21 and the graduated portion of scale 18.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is set forth in the appended claims.

We claim:

1. In a photographic apparatus, a housing; film transporting means mounted in said housing and operative to advance the film during exposure whereby the length of exposed and unexposed parts of the film respectively increases and decreases; a scale mounted in said housing and having indicia representing the length of at least one of said parts of the film; a pointer movable in said housing from a starting position to pinpoint on said scale the length of said one part of the film; motion transmitting means including a carrier, a first portion rotatably mounted on said carrier and driven by said film transporting means, and a second portion rigid with said pointer and separably engaging said first portion to move the pointer from said starting position during operation of said film transporting means upon insertion of film into said housing; and disengaging means for separating said portions in automatic response to removal of the film from said housing to thus permit movement of the pointer to said starting position.

2. In a photographic apparatus, a housing; film transporting means mounted in said housing and operative to advance the film whereby the length of exposed and unexposed parts of the film respectively increases and decreases; a scale mounted in said housing and having indicia representing the length of at least one of said parts of the film; a pointer movable in said housing from a starting position to pinpoint on said scale the length of said one part of the film; resetting means for permanently biasing said pointer to said starting position; motion transmitting means including a first portion driven by said film transporting means and a second portion separably engaging said first portion to move the pointer from said starting position during operation of said film transporting means upon insertion of film into said housing; and disengaging means for separating said portions in automatic response to removal of film from said housing to thus permit automatic movement of said pointer to said starting position under the action of said resetting means.

3. A structure as defined in claim 2, wherein said first portion comprises a rotary worm and said second portion comprises a follower which is rigid with said pointer and normally engages with the thread of said worm to move the pointer in response to rotation of said worm by said film transporting means.

4. A structure as defined in claim 2, wherein said first portion is movable in said housing between a first position of engagement with and a second position of disengagement from said second portion, and further comprising means for biasing the first portion to said first position, said disengaging means comprising resilient means operative to move the first portion to said second position in response to removal of film from said housing.

5. A structure as defined in claim 4, further comprising carrier means for said first portion, said carrier comprises a lever which is pivotable with said first portion between said first and second positions.

6. In a photographic apparatus, a housing; film transporting means mounted in said housing an operative to advance the film during exposure whereby the length of exposed or unexposed parts of the film respectively increases and decreases; a scale mounted in said housing and having indicia representing the length of at least one of said parts of the film; a pointer movable in said housing from a starting position to pinpoint on said scale the length of said one part of the film; resetting means for biasing the pointer to said starting position; motion transmitting means including a first portion driven by said film transporting means, a second portion separably engaging said first portion to move the pointer from said starting position during operation of said film transporting means upon insertion of film into said housing, said first portion being movable in said housing between a first position of engagement with and a second position of disengagement from said second portion and said second portion constituting a follower rigid with said pointer, and carrier means for said first portion, said carrier means including a lever pivotable with said first portion between said first and second positions and said first portion being rotatably mounted on said lever; means for biasing the first portion of said motion transmitting means to said first position thereof; and disengaging means for separating said portions of said motion transmitting means in response to removal of film from said housing to thus permit movement of said pointer to its starting position under the action of said resetting means, said disengaging means comprising resilient means operative to move the first portion of said motion transmitting means to said second position in response to removal of the film from said housing.

7. A structure as defined in claim 6, wherein said first portion comprises a gear wheel and said film transporting means comprises a second gear meshing with said gear wheel in each angular position of said lever.

8. A structure as defined in claim 7, wherein said second gear has a worn thread meshing with the teeth of said gear wheel.

9. A structure as defined in claim 7, wherein said first portion further includes a worm rigid with said gear wheel and said second portion comprises a follower rigid with said pointer and engaging the thread of said worm in the first position of said lever.

10. In a photographic apparatus, a housing; film transporting means mounted in said housing and operative to advance the film during exposure whereby the length of exposed and unexposed parts of the film respectively increases and decreases; a scale mounted in said housing and having indicia representing the length of at least one of said parts of the film, said scale consisting at least partially of light transmitting material; a pointer movable in said housing from a starting position to pinpoint on said scale the length of said one part of the film; motion transmitting means including a first portion driven by said film transporting means and a second portion separably engaging said first portion to move the pointer from said starting position during operation of said film transporting means upon insertion of film into said housing; disengaging means for separating said portions in response to removal of the film from said housing to thus permit movement of the pointer to said starting position; and an observation window, said scale having a first portion registering with said window and a second portion exposed to ambient light in the starting position of said pointer so that said first portion of the scale is readily observable in said window when the second portion of the scale is exposed to light, said pointer having a portion which progressively shields said second portion of the scale from ambient light in response to movement of the pointer from said starting position.

11. A structure as defined in claim 10, further comprising view finder means in said housing, said window being provided in said view finder means.

12. A structure as defined in claim 11, wherein said housing is provided with a second window which admits light to the second portion of said scale and wherein said portion of the pointer is opaque and is movable between said second window and said second portion of the scale.

13. In a photographic apparatus, a housing; film transporting means mounted in said housing and operative to advance the film during exposure whereby the length of exposed and unexposed parts of the film respectively increases and decreases; indicating means having indicia for indicating the length of at least one of said parts of the film; pointer means normally tending to assume in said housing a starting position and being movable from such starting position with reference to said indicia to thereby pinpoint the length of said one part of the film; motion transmitting means including bearing means, a first portion rotatably mounted in said bearing means and driven by said film transporting means, and a second portion movable with said pointer means and separably engaging said first portion to move the pointer means from said starting position in response to operation of said film transporting means; and disengaging means for separating said first and second portions of said motion transmitting means in response to removal of film from said housing to thus effect the movement of said pointer means to said starting position.